United States Patent
Tanji

(10) Patent No.: US 10,382,923 B2
(45) Date of Patent: Aug. 13, 2019

(54) COMMUNICATION APPARATUS CAPABLE OF PREVENTING DATA ERRONEOUS TRANSMISSION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Masamichi Tanji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 14/571,853

(22) Filed: Dec. 16, 2014

(65) Prior Publication Data

US 2015/0195161 A1 Jul. 9, 2015

(30) Foreign Application Priority Data

Jan. 7, 2014 (JP) ................................. 2014-000885

(51) Int. Cl.
- *G06F 15/173* (2006.01)
- *H04W 4/70* (2018.01)
- *H04L 29/12* (2006.01)

(52) U.S. Cl.
CPC ........... *H04W 4/70* (2018.02); *H04L 61/2046* (2013.01); *H04L 61/2015* (2013.01); *H04L 61/6068* (2013.01)

(58) Field of Classification Search
CPC . H04L 61/2015; H04L 61/2092; H04L 43/50; H04L 61/2038; H04L 61/6022;
(Continued)

(56) References Cited

U.S. PATENT DOCUMENTS

| | | | |
|---|---|---|---|
| 9,143,929 B1* | 9/2015 | Chen | ..................... H04W 8/265 |
| 2004/0120260 A1* | 6/2004 | Bernier | ............... H04L 61/2015 370/252 |

(Continued)

FOREIGN PATENT DOCUMENTS

| | | |
|---|---|---|
| JP | 5010741 B2 | 8/2012 |
| JP | 2013157942 A | 8/2013 |

OTHER PUBLICATIONS

Office Action issued in Japanese Appln. No. 2014000885 dated Nov. 21, 2017.

*Primary Examiner* — Brian J. Gillis
*Assistant Examiner* — Thao D Duong
(74) *Attorney, Agent, or Firm* — Rossi, Kimms & McDowell LLP

(57) ABSTRACT

A communication apparatus that is capable of preventing data erroneous transmission without disturbing communication with a networking device. The communication apparatus is connectable with a plurality of networks including at least a first network and a second network. A specifying unit specifies an IP address of the communication apparatus that is used in communication with an external apparatus on the first network. A determination unit determines an IP address of which a network part is different from a network part of the IP address specified by the specifying unit as an IP address that will be distributed to an external apparatus on the second network. A distribution unit distributes the IP address determined by the determination unit to the external apparatus on the second network.

24 Claims, 13 Drawing Sheets

(58) Field of Classification Search
CPC ............. H04L 29/1232; H04L 61/2046; H04L 12/2856; G06F 8/60; G06F 12/10; G06F 13/385; G06F 13/40; G06F 13/4004
See application file for complete search history.

(56) References Cited

U.S. PATENT DOCUMENTS

| | | | |
|---|---|---|---|
| 2004/0122974 A1* | 6/2004 | Murakami | H04L 61/2007 709/245 |
| 2006/0177063 A1* | 8/2006 | Conway | H04L 63/02 380/270 |
| 2007/0177612 A1* | 8/2007 | Kubota | H04L 29/12264 370/395.52 |
| 2010/0100646 A1* | 4/2010 | Park | H04L 12/413 710/8 |
| 2010/0274924 A1* | 10/2010 | Allan | H04L 12/2881 709/245 |
| 2011/0191468 A1 | 8/2011 | Arashin et al. | |
| 2012/0131197 A1* | 5/2012 | Prentice | H04L 61/103 709/226 |
| 2012/0311184 A1* | 12/2012 | Yamada | H04L 61/2038 709/245 |
| 2013/0148573 A1* | 6/2013 | Boland | H04W 8/005 370/328 |
| 2014/0056209 A1* | 2/2014 | Park | H04W 16/26 370/315 |

* cited by examiner

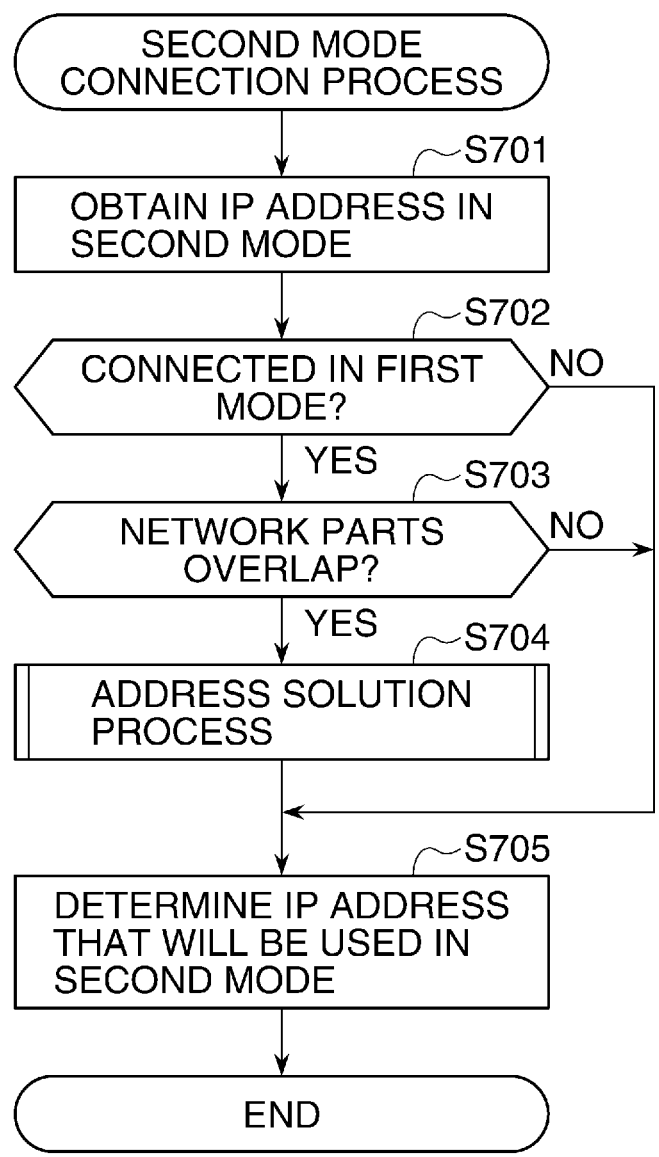

COMMUNICATION APPARATUS CAPABLE OF PREVENTING DATA ERRONEOUS TRANSMISSION, CONTROL METHOD THEREFOR, AND STORAGE MEDIUM STORING CONTROL PROGRAM THEREFOR

BACKGROUND OF THE INVENTION

Field of the Invention

The present invention relates to a communication apparatus that is capable of preventing data erroneous transmission, and a control method therefor, and a storage medium storing a control program therefor.

Description of the Related Art

In recent years, many image forming apparatuses mount a wireless LAN function. An image forming apparatus that mounts the wireless LAN function is generally provided with an infrastructure mode that is a function to connect with an access point wirelessly as a client.

A PC, a portable terminal, etc. communicate with an image forming apparatus through an access point, and transmit desired data and make it print, or receive apparatus information from the image forming apparatus to manage the apparatus, for example.

In one of addressing methods in the case where an image forming apparatus operates in such an infrastructure mode, an access point serves as a DHCP (Dynamic Host Configuration Protocol) server and distributes an IP address to the image forming apparatus that is served as a DHCP client.

Then, the image forming apparatus communicates with a PC, a portable terminal, etc. using the IP address distributed from the DHCP server.

On the other hand, "Wi-Fi Direct" (registered trademark) was recently enacted by the Wi-Fi Alliance. The Wi-Fi Direct regulates a protocol that automatically determines whether a wireless terminal operates as an access point or as a client.

Use of the Wi-Fi Direct makes it unnecessary to prepare an access point separately, and enables to execute various application services, such as an image share and a printing, with direct communication between wireless terminals.

FIG. 13 is a view schematically showing a process sequence of the Wi-Fi Direct. In the sequence shown in FIG. 13, it is assumed that both of an image forming apparatus and a portable terminal support the Wi-Fi Direct.

Each of the image forming apparatus and the portable terminal searches for another apparatus that is trying wireless connection in the Wi-Fi Direct, and finds a partner apparatus by detecting each other. When the partner apparatus is found, a roll of each apparatus is determined. The roll means an access point (Group Owner) or a client (Client). In this example, the image forming apparatus shall become an access point and the portable terminal shall become a client.

Next, the image forming apparatus and the portable terminal exchange parameters of wireless connection by using WPS (Wi-Fi Protected Setup) etc., and secure connection is established using the parameters.

Next, when the image forming apparatus distributes an IP address to the portable terminal by the DHCP, an IP connection is established.

Execution of this processing sequence enables direct communication between an application service mounted in the image forming apparatus and an application service mounted in the portable terminal.

Thus, the image forming apparatus allows two communications that are the communication using the Wi-Fi Direct and the communication in the infrastructure mode.

In this case, the IP address distributed to the portable terminal by the Wi-Fi Direct from the image forming apparatus may become identical to the IP address distributed as a DHCP client in the infrastructure mode from the access point.

If these IP addresses are identical, the image forming apparatus cannot determine whether a certain packet should be transmitted through the path of the wireless connection in the infrastructure mode or through the path of the wireless connection using the Wi-Fi Direct.

When the packet was transmitted to a wrong path, the communication using the packet concerned fails, and the packet that should not be flowed to the wrong path is flowed, which is not preferable from the point of view of security.

There is a known technique of avoiding overlap of the network address in the apparatus that is provided with the communication interfaces which enable a plurality of communications (for example, see Japanese Patent Publication No. 5010741 (JP 5010741B2)).

This patent discloses an addressing method to connect with different networks as a DHCP client and to obtain IP addresses from DHCP servers corresponding to the respective networks.

When the IP addresses obtained from the communication interfaces are identical, data erroneous transmission may occur. In such a case, the IP address concerned is distributed to only one communication interface, and is not distributed to the other communication interface. This avoids the situation where a plurality of communication interfaces operate with the same IP address.

However, the technique disclosed in the above-mentioned patent does not enable to communicate through the other communication interface to which an IP address is not distributed. Accordingly, the above-mentioned technique has a problem that prevention of erroneous transmission disturbs communication with a network device.

SUMMARY OF THE INVENTION

The present invention provides a communication apparatus, a control method therefor, and a storage medium storing a control program therefor, which are capable of preventing data erroneous transmission without disturbing communication with a networking device.

Accordingly, a first aspect of the present invention provides a communication apparatus that is connectable with a plurality of networks including at least a first network and a second network, comprising a specifying unit configured to specify an IP address of the communication apparatus that is used in communication with an external apparatus on the first network, a determination unit configured to determine an IP address of which a network part is different from a network part of the IP address specified by the specifying unit as an IP address that will be distributed to an external apparatus on the second network, and a distribution unit configured to distribute the IP address determined by the determination unit to the external apparatus on the second network.

Accordingly, a second aspect of the present invention provides a communication apparatus that is connectable with a plurality of networks including at least a first network and a second network, comprising a setting unit configured to set a range of an IP address that will be distributed to an external apparatus on the second network on the basis of a user's designation, a distribution unit configured to distribute an IP address included in the range set by the setting unit to the external apparatus on the second network, a specifying unit configured to specify an IP address of the communication apparatus that is used in communication with an external apparatus on the first network, and a control unit configured to control the setting unit not to set a range an IP address of which a network part is identical to a network part of the IP address specified by the specifying unit.

Accordingly, a third aspect of the present invention provides a control method for a communication apparatus that is connectable with a plurality of networks including at least a first network and a second network, the control method comprising a specifying step of specifying an IP address of the communication apparatus that is used in communication with an external apparatus on the first network, a determination step of determining an IP address of which a network part is different from a network part of the IP address specified in the specifying step as an IP address that will be distributed to an external apparatus on the second network, and a distribution step of distributing the IP address determined in the determination step to the external apparatus on the second network.

Accordingly, a fourth aspect of the present invention provides a non-transitory computer-readable storage medium storing a control program causing a computer to execute the control method of the third aspect.

Accordingly, a fifth aspect of the present invention provides a control method for a communication apparatus that is connectable with a plurality of networks including at least a first network and a second network, the control method comprising a setting step of setting a range of an IP address that will be distributed to an external apparatus on the second network on the basis of a user's designation, a distribution step of distributing an IP address included in the range set in the setting step to the external apparatus on the second network, a specifying step of specifying an IP address of the communication apparatus that is used in communication with an external apparatus on the first network, and a control step of controlling so as not to set in the setting step a range of an IP address of which a network part is identical to a network part of the IP address specified in the specifying step.

Accordingly, a sixth aspect of the present invention provides a non-transitory computer-readable storage medium storing a control program causing a computer to execute the control method of the fifth aspect.

According to the present invention, the IP address that will be distributed to an external apparatus on the second network is determined on the basis of the IP address that is used in the communication with an external apparatus on the first network. And the determined IP address is distributed to the external apparatus on the second network. As a result, data erroneous transmission is prevented without disturbing communication with a network device.

Further features of the present invention will become apparent from the following description of exemplary embodiments with reference to the attached drawings.

BRIEF DESCRIPTION OF THE DRAWINGS

FIG. 6 is a flowchart showing procedures of a second mode communication process executed by the CPU shown in FIG. 2.

DESCRIPTION OF THE EMBODIMENTS

Hereafter, embodiments according to the present invention will be described in detail with reference to the drawings.

Figure 1:
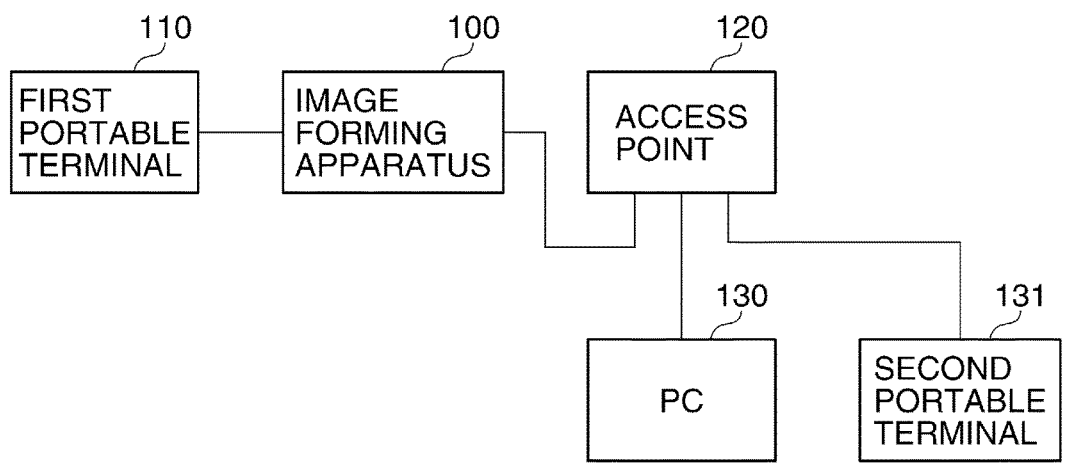
FIG. 1 is a view showing a printing system including an image forming apparatus according to a first embodiment of the present invention.

FIG. 1 is a view showing a printing system 1 including an image forming apparatus 100 according to a first embodiment of the present invention.

As shown in FIG. 1, the printing system 1 consists of the image forming apparatus 100, first and second portable terminals 110 and 131, a PC 130, and an access point 120.

The first portable terminal 110 is wirelessly connected with the image forming apparatus 100. The image forming apparatus 100 is connected with the PC 130 and the second portable terminal 131 through the access point 120 wirelessly or with a wire. Moreover, the access point 120 is provided with a DHCP (Dynamic Host Configuration Protocol) function to operate as a DHCP server. In the embodiment, the image forming apparatus 100 is employed as an example of a communication apparatus concerning the present invention.

The image forming apparatus 100 in the embodiment has two communication modes, which are a first mode and a second mode.

In the first mode, the image forming apparatus 100 or the first portable terminal 110 operates as an access point so that the image forming apparatus 100 communicates with the first portable terminal 110 directly and wirelessly.

For example, the image forming apparatus 100 and the first portable terminal 110 communicate directly and wirelessly using the Wi-Fi Direct in the first mode.

In the second mode, the image forming apparatus 100 communicates with the PC 130 or the second portable terminal 131 through the access point 120 or a router (not shown) on the network.

For example, the wireless communication in the infrastructure mode is available in the second mode. An IP address used in the second mode is the IP address distributed from the access point 120 as a result of the operation as a DHCP client in the second mode, or the fixed IP address that a network administrator has set to the image forming apparatus 100 beforehand.

Although the DHCP is described as an example of an automatic address acquisition method, other automatic address acquisition methods, such as BOOTP (Bootstrap Protocol), may be employed.

The communications in the first and second modes mentioned above are independent, and they are able to operate simultaneously.

It should be noted that the first portable terminal 110 cannot communicate with the PC 130 nor the second portable terminal 131 through the image forming apparatus 100 and the access point 120.

In this way, an IP address is obtained from the access point 120 that is a networking device, and the IP address is distributed (allocated) to the first portable terminal 110 that is another networking device in the embodiment.

Moreover, as shown in FIG. 1, the image forming apparatus 100 is connectable with a plurality of networks containing the network that consists of the image forming apparatus 100 and the first portable terminal 110 and the network that consists of the image forming apparatus 100, the access point 120, the PC 130 and the second portable terminal 131.

Figure 2:
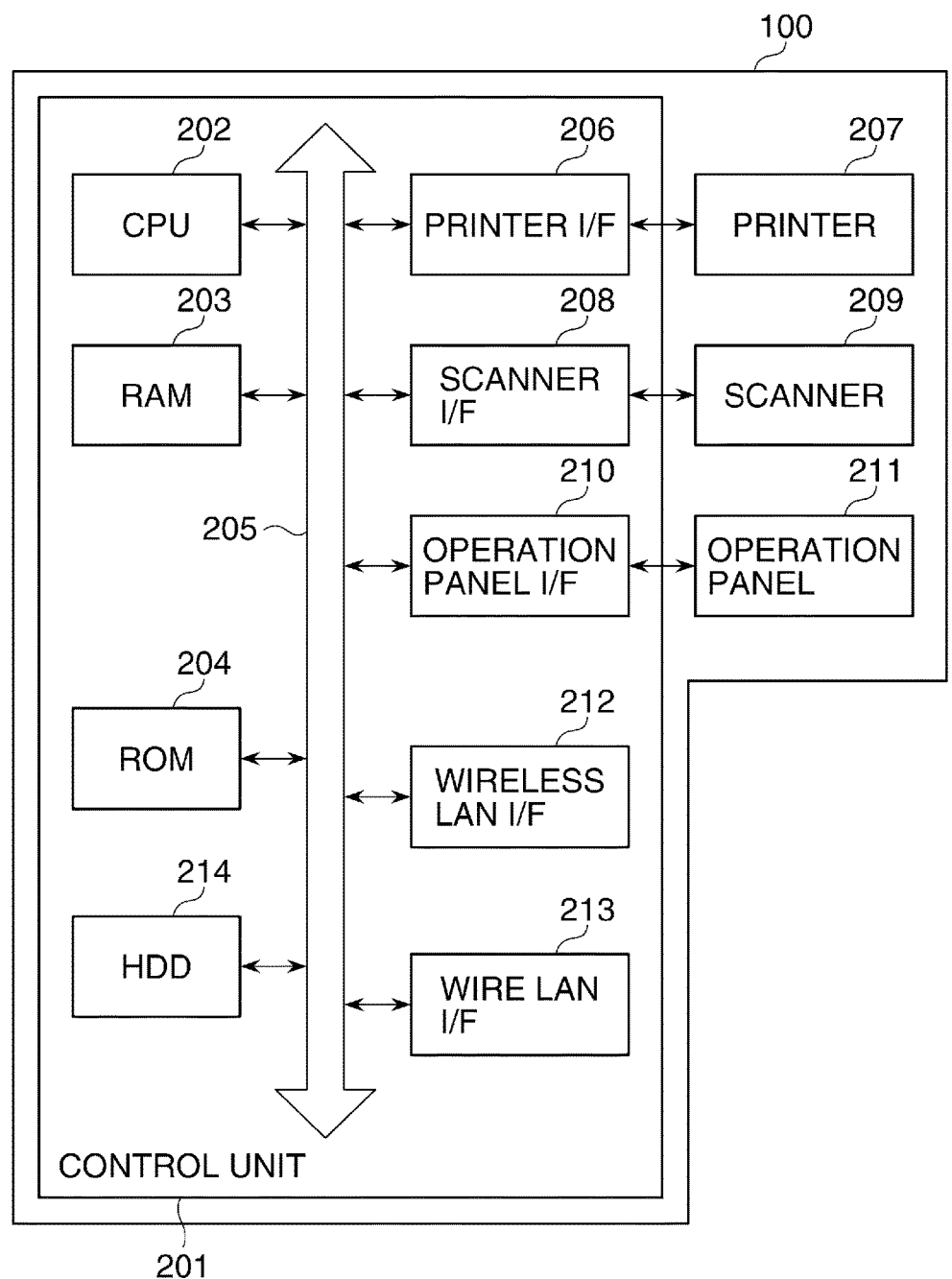
FIG. 2 is a block diagram schematically showing a hardware configuration of the image forming apparatus shown in FIG. 1.

FIG. 2 is a block diagram schematically showing a hardware configuration of the image forming apparatus 100 shown in FIG. 1.

As shown in FIG. 2, the image forming apparatus 100 consists of a control unit 201, a printer 207, a scanner 209, and an operation panel 211.

The control unit 201 connects with the printer 207, the scanner 209, and the operation panel 211, and controls the image forming apparatus 100 whole.

The printer 207 receives print data from the control unit 201, and prints an image that the print data indicates onto a recording medium, such as a paper sheet. The scanner 209 reads an original, and outputs the image signal that indicates the image of the original to the control unit 201. The operation panel 211 displays information to a user according to a command from the control unit 201 and outputs a content of a user's operation inputted through a touch panel, a button, etc. to the control unit 201.

Moreover, the control unit 201 consists of a CPU 202, a RAM 203, a ROM 204, an HDD 214, a printer interface (I/F) 206, a scanner interface 208, an operation panel interface 210, a wireless LAN interface 212, and a wire LAN interface 213, which are connected through a bus 205.

The CPU 202 controls the entire image forming apparatus 100 by controlling the control unit 201. The RAM 203 stores various programs that the CPU 202 executes and data. The ROM 204 stores a boot program, a various programs, data, etc. The HDD 214 stores a various programs, image data, etc.

The printer interface 206 is an interface between the printer 207 and the control unit 201. The scanner interface 208 is an interface between the scanner 209 and the control unit 201. The operation panel interface 210 is an interface between the operation panel 211 and the control unit 201.

The wireless LAN interface 212 supports protocols, such as the IEEE802.11 system, and is an interface for connecting with the LAN wirelessly. The wire LAN interface 213 is an interface for connecting with the LAN through a twisted-pair cable connected.

Figure 3:
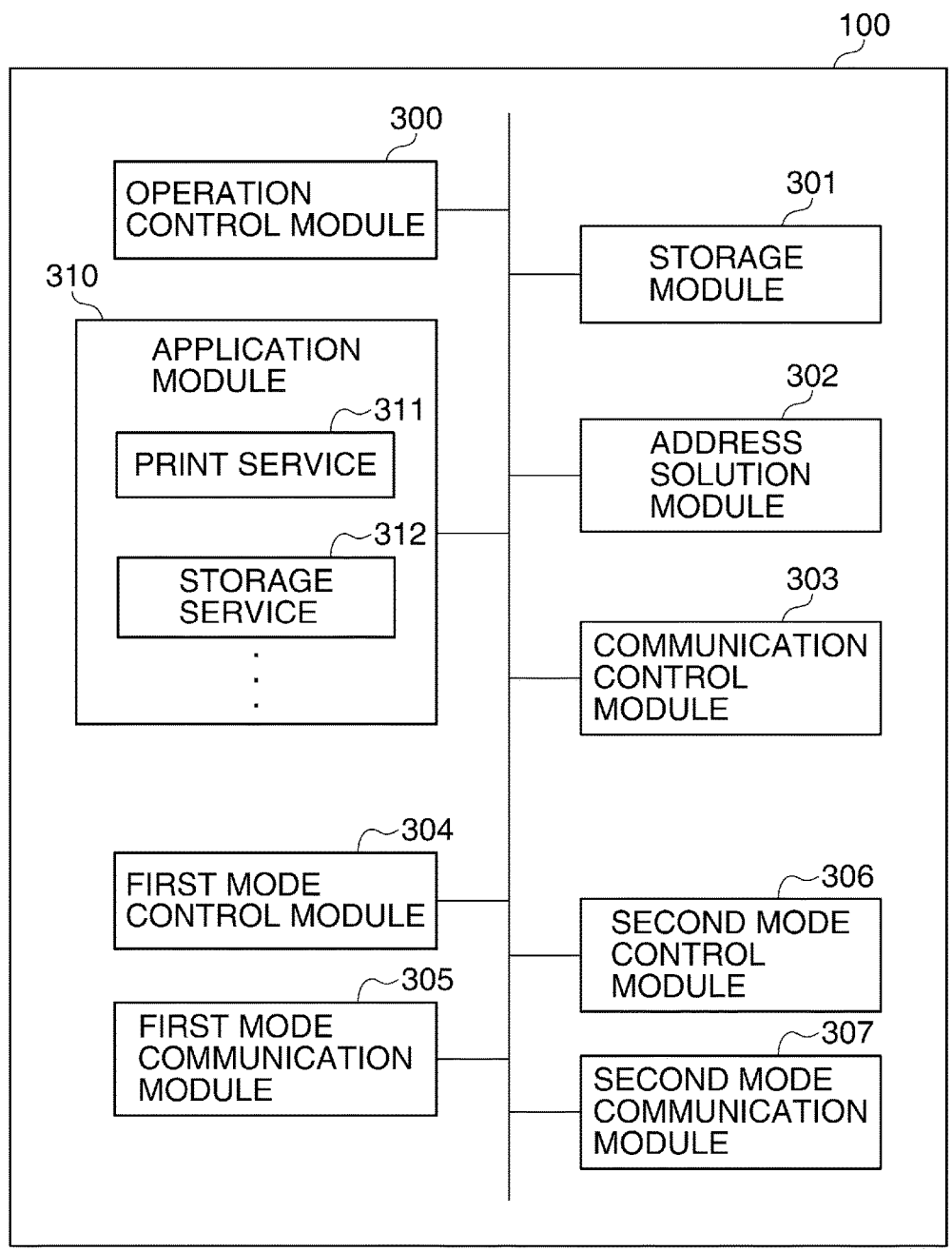
FIG. 3 is a block diagram schematically showing a software configuration of the image forming apparatus shown in FIG. 1.

FIG. 3 is a block diagram schematically showing a software configuration of the image forming apparatus 100 shown in FIG. 1.

As shown in FIG. 3, the software of the image forming apparatus 100 consists of an operation control module 300, an application module 310, a storage module 301, an address solution module 302, a communication control module 303, a first mode control module 304, a first mode communication module 305, a second mode control module 306, and a second mode communication module 307.

Each of the above-mentioned modules achieves each function when the CPU 202 executes a program stored in the RAM 203. Flowcharts mentioned later show processes that the CPU 202 executes programs that are stored in the HDD 214 and are expanded onto the RAM 203.

The operation control module 300 controls the operation panel 211. The operation control module 300 displays an operation menu on the operation panel 211 to wait an instruction input from a user, notifies the modules of the received instruction content, or displays an instruction result on the operation panel 211.

The storage module 301 stores designated data to the RAM 203 or the HDD 214 according to a command from a module, or reads stored data.

The address solution module 302 performs an IP address solution process of the image forming apparatus 100. The address solution module 302 determines IP addresses of the first mode communication module 305 and the second mode communication module 307 according to setting stored by the storage module 301.

Specifically, the address solution module 302 has a function to use the fixed IP address stored by the storage module 301, a function to operate as a DHCP client, and a DHCP function to the image forming apparatus 100 itself and external terminals connected to the image forming apparatus 100.

The communication control module 303 controls communications between the image forming apparatus 100 and external apparatuses, such as the first portable terminal 110.

Specifically, the communication control module 303 makes the data from the application module 310 transmit to the network through the first mode communication module 305 or the second mode communication module 307.

Moreover, the communication control module 303 passes the data received from the network through the first mode communication module 305 or the second mode communication module 307 to the application module 310. In the following description, the first mode communication module 305 and the second mode communication module 307 may be collectively expressed as a communication module.

Furthermore, the communication control module 303 determines a communication module through which data is transmitted according to the IP addresses allocated to the first mode communication module 305 and the second mode communication module 307.

For example, the IP address allocated to the first mode communication module 305 by the address solution module 302 shall be "192.168.11.1", and the IP address allocated to the second mode communication module 307 shall be "192.168.0.100".

Then, the destination IP address shown in the data passed from the application module 310 shall be "192.168.0.2".

In this case, the network part "192.168.0" that is the same as the destination IP address of the transmission data is allocated to the second mode communication module 307.

Accordingly, the communication control module 303 passes the data concerned to the second mode communication module 307 to make the data transmit to the network.

The first mode control module 304 controls the communication at the time when the image forming apparatus 100 operates in the first mode. The first mode communication module 305 controls the wireless LAN interface 212, and exchanges data when the application module 310 communicates with an external apparatus, such as the first portable terminal 110, in the first mode.

The second mode control module 306 controls the communication at the time when the image forming apparatus 100 operates in the second mode. The second mode communication module 307 controls the wireless LAN interface 212 or the wire LAN interface 213 and exchanges data when the application module 310 communicates with external apparatuses, such as the PC 130 and the second portable terminal 131, in the second mode.

The application module 310 consists of various services, such as a print service 311 and a storage service 312.

The print service 311 receives the print data received from the first mode communication module 305 or the second mode communication module 307 through the communication control module 303, and outputs the print data concerned to the printer 207 through the printer interface 206.

The storage service 312 receives the data received from the first mode communication module 305 or the second mode communication module 307 through the communication control module 303, and stores the data concerned to the storage unit, such as the HDD 214.

Hereinafter, the process at the time of connecting in the first mode and the process at the time of connecting in the second mode will be described in order.

Figure 4:
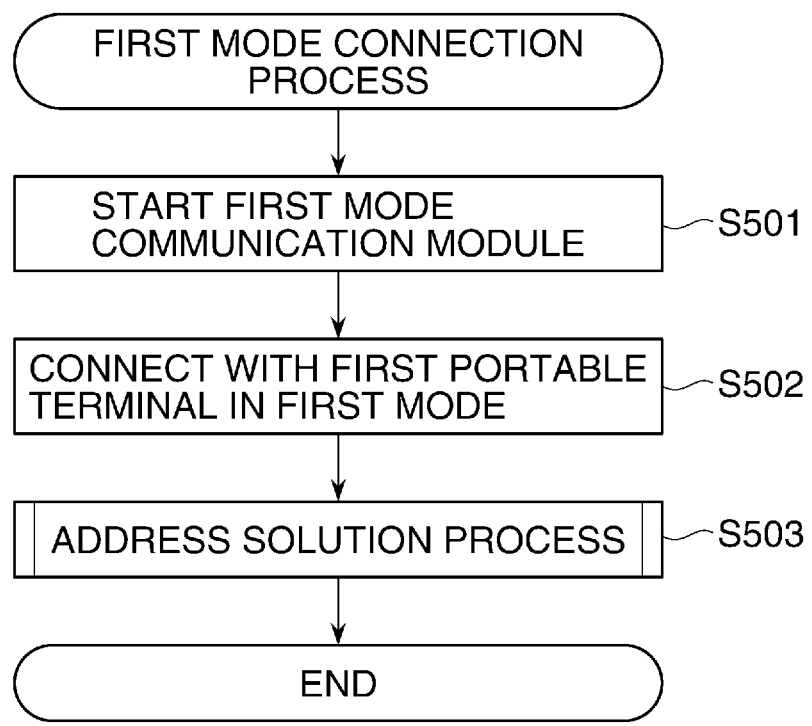
FIG. 4 is a flowchart showing procedures of a first mode connection process executed by a CPU shown in FIG. 2.

FIG. 4 is a flowchart showing procedures of the first mode connection process executed by the CPU 202 shown in FIG. 2.

As shown in FIG. 4, the first mode control module 304 starts the first mode communication module 305 (step S501). This enables wireless connection in the first mode through the wireless LAN interface 212.

Next, the first mode control module 304 connects with the first portable terminal 110 in the first mode (step S502). Then, the address solution module 302 executes the address solution process for distributing an IP address to the first portable terminal 110 (step S503), and finishes this process.

The process in the above mentioned step S502 will be specifically described. First, the first portable terminal 110 is found by transmitting a retrieval packet for searching an external apparatus that executes the connection process in the first mode.

Next, a role determination process for determining an apparatus that behaves as an access point (Group Owner) and an apparatus that behaves as a client is executed. In the embodiment, the image forming apparatus 100 shall behave as an access point and the first portable terminal 110 shall behave as a client.

Then, the image forming apparatus 100 exchanges parameters of wireless connection with the first portable terminal 110 using the WPS etc., secure connection is established using the parameters, and the progress proceeds to the address solution process in the step S503.

Figure 5:
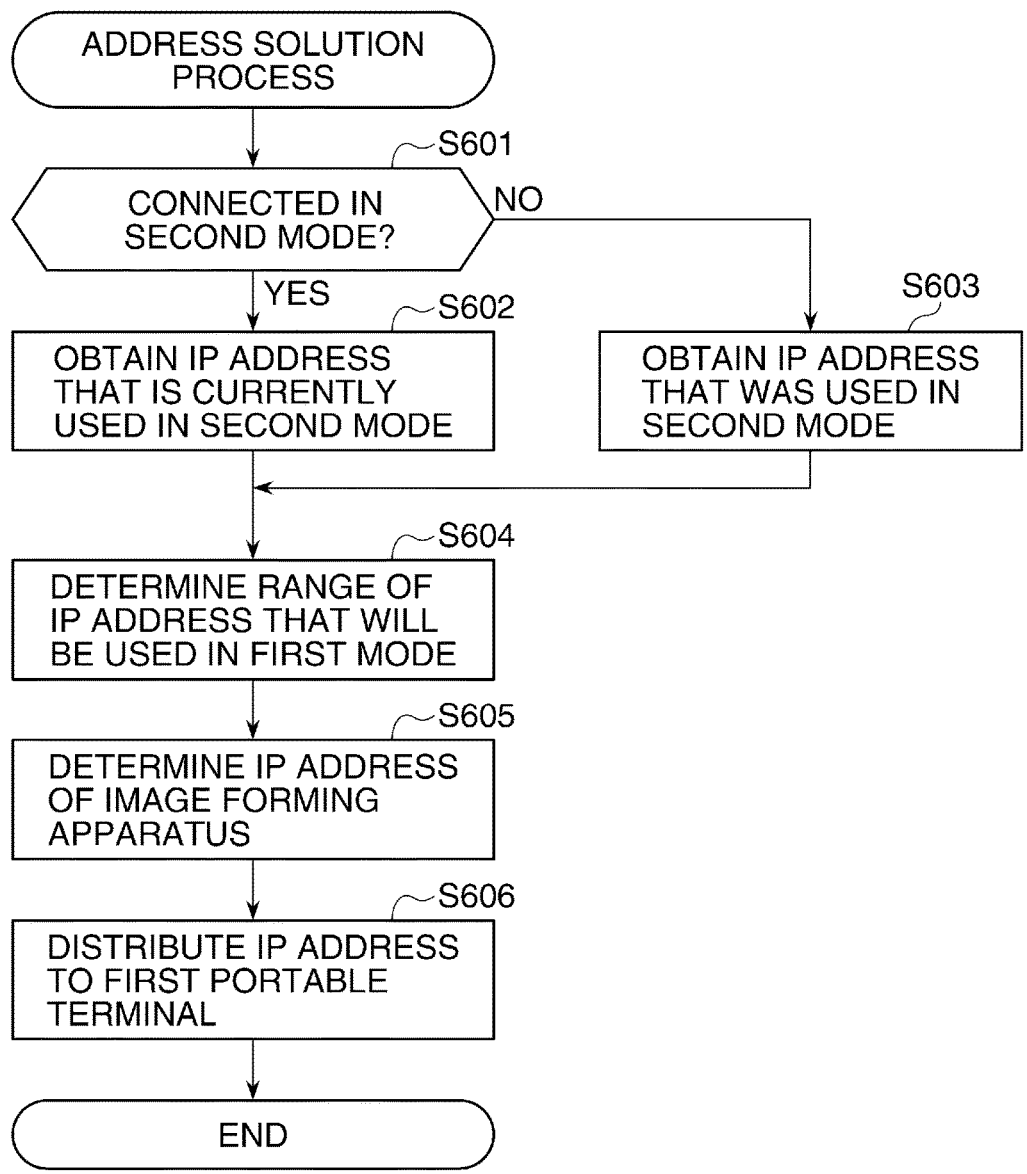
FIG. 5 is a flowchart showing procedures of an address solution process executed in step S503 in FIG. 4.

FIG. 5 is a flowchart showing procedures of the address solution process executed in the step S503 in FIG. 4.

As shown in FIG. 5, the address solution module 302 obtains the address setting information in the second mode by the storage module 301, and determines whether the image forming apparatus 100 has been already connected to the access point 120 in the second mode (step S601).

As a result of the determination in the step S601, when the apparatus has been already connected in the second mode (YES in the step S601), the IP address that is currently used in the second mode is obtained by the storage module 301 (step S602), and the process proceeds to the step S604.

On the other hand, when the apparatus is not connected in the second mode (NO in the step S601), the IP address that was used in the second mode is obtained (step S603). Here, the IP address that was used in the second mode at last time shall be obtained by the storage module 301 as the IP address that was used in the second mode.

Next, a range of an IP address that will be used in the first mode (referred to as "a first mode address", hereafter) is determined (specified) using the obtained address (step S604). The determination method in this step will be described below.

Next, the IP address of the image forming apparatus 100 in the first mode is selected from among IP addresses within the determined range (step S605), and the selected IP address is stored to the HDD 214 with the storage module 301.

Then, an IP address that is included within the determined range and is different from the IP address selected in the step S605 is distributed to the first portable terminal 110 (step S606), and this process is finished.

The determination method of a range of an IP address in the above-mentioned step S604 will be described. First, a range of an IP address is defined as a range where network parts of IP addresses are different.

For example, when the IP address that is used or was used in the second mode (referred to as "a second mode address", hereafter) is "192.168.0.100" and the host part is 8 bits, the network part is "192.168.0" and IP addresses with a network part different from this network part are included within the above-mentioned range. For example, IP addresses within the above-mentioned range are determined as "192.168.11.1" through "192.168.11.25" that have a network part different from "192.168.0".

The embodiment is characterized in that the IP address of which the network part is different from the network part of the IP address obtained from the access point, i.e., the second mode address, is distributed to the first portable terminal 110. This prevents a packet from transmitting to the wrong communication path during communication of the image forming apparatus 100. The network part of the IP address that is distributed to the first portable terminal 110 and does not overlap with the IP address obtained from the access point 120 shall be different from the network part of the obtained IP address.

It should be noted that the IP address with the different network part is not necessarily used when a range of the second mode address is known or when there are a few connection devices. However, it is preferable to determine the range using the different network part in order to reduce the possibility of overlap.

Moreover, the IP address that was used in the second mode at the last time is obtained when the apparatus is not connected in the second mode because there is a high possibility that the IP address distributed from the DHCP server is the same as the IP address that was used at the last time.

Moreover, the IP address that was used in the second mode is obtained at the above-mentioned step S603, and the IP address obtained at the step S603 becomes "0.0.0.0" when the apparatus never operated before in the second mode, such as a first time start-up of the image forming apparatus 100.

In this case, since there is no possibility that the network parts overlap, the range of IP addresses is arbitrarily determined in the step S604.

FIG. 6 is a flowchart showing procedures of the second mode connection process executed by the CPU 202 shown in FIG. 2.

As shown in FIG. 6, when receiving the command from the second mode control module 306, the address solution module 302 transmits a request as a DHCP client through the second mode communication module 307, and obtains the IP address in the second mode from the access point 120 (step S701).

Next, the CPU 202 determines whether the apparatus is connecting in the first mode (step S702). As a result of the determination in the step S702, it is determined that the apparatus is not connecting in the first mode (NO in the step S702), the obtained IP address is determined as the address that will be used in the second mode (step S705), the determined IP address is stored to the HDD 214 with the storage module 301, and this process is finished.

On the other hand, as a result of the determination in the step S702, when the apparatus has been already connected in the first mode (YES in the step S702), the first mode address is obtained by the storage module 301.

Then, it is determined whether the network part of the IP address obtained in the step S701 overlaps with the network part of the first mode address (step S703).

As a result of the determination in the step S703, when network parts do not overlap (NO in the step S703), the process proceeds to the step S705.

On the other hand, as a result of the determination in the step S703, when the network parts overlap (YES in the step S703), the address solution process shown in FIG. 5 is executed (step S704).

The address solution process changes the first mode address, and the IP address obtained in the step S701 is determined as the address used in the second mode (step S705). The CPU 202 stores the determined IP address to the HDD 214 with the storage module 301, and finishes this process.

As mentioned above, when the IP address obtained from the access point 120 after distributing an IP address to the first portable terminal 110 overlaps with the IP address distributed to the first portable terminal 110, an IP address that does not overlap with the IP address obtained from the access point 120 is distributed in this embodiment.

For example, when the IP address obtained in the step S701 is "192.168.11.2" and the first mode address is "192.168.11.1", it is determined that the network parts overlap in the above-mentioned step S703.

Either the first mode connection process or the second mode connection process avoids overlap of IP addresses by giving priority to the second mode address when the IP addresses overlap.

Moreover, since the above mentioned process makes the network part of the first mode address differ from the network part of the second mode address, the communication control module 303 prevents erroneous transmission of data.

This is because the communication control module 303 is able to determine whether the data passed from the application module 310 should be passed to the first mode communication module 305 or the second mode communication module 307 by referring to the network part.

Since erroneous transmission of data is prevented, rise of traffic and fear in security that occur due to erroneous transmission are eliminated.

Although the address solution module 302 automatically determines the range of the first mode address to distribute in the above-mentioned embodiment, it is possible to allow a user to set the range.

Figure 7A:
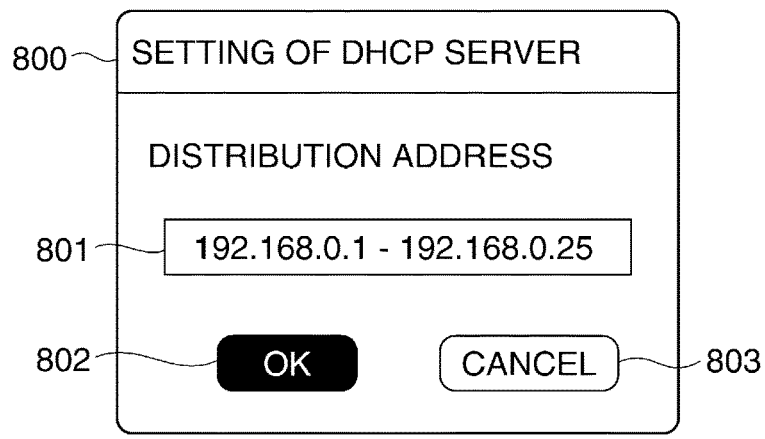
FIG. 7A, FIG. 7B, and FIG. 7C are views showing screen examples displayed on an operation panel in FIG. 2.
Figure 7B:
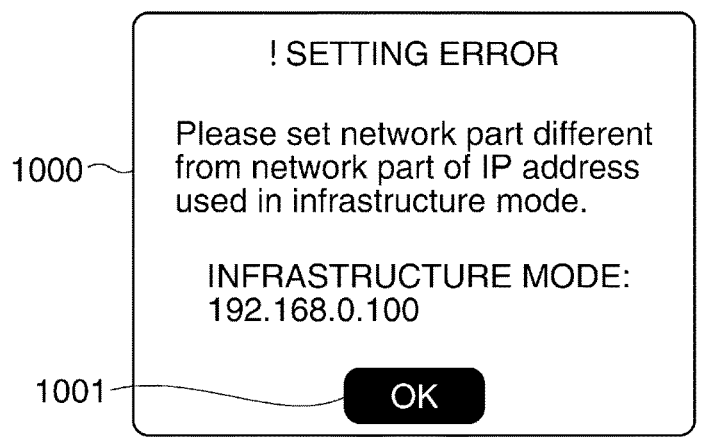
Figure 7C:
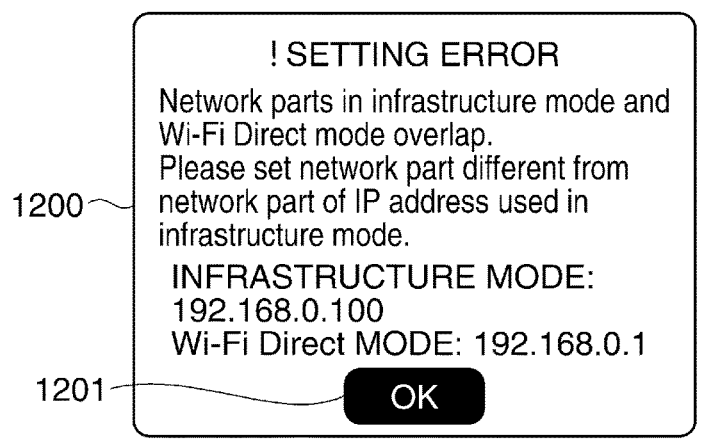

FIG. 7A, FIG. 7B, and FIG. 7C are views showing screen examples displayed on the operation panel 211 in FIG. 2.

FIG. 7A is a view showing a DHCP server setting screen 800.

As shown in FIG. 7A, the DHCP server setting screen 800 contains a distribution address setting column 801, an OK button 802, and a cancel button 803.

A user inputs a desired range of a first mode address into the distribution address setting column 801. In FIG. 7A, the user shall input "192.168.0.1~192.168.0.25" as the range of a first mode address.

When the OK button 802 is pressed in this state, the operation control unit 300 stores the content of the distribution address setting column 801 to the HDD 214 with the storage module 301. Thereby, the range of a first mode address is set up. When the input range overlaps with the network part of the second mode address, a screen shown in FIG. 7B is displayed.

On the other hand, when the cancel button 803 is pressed, the contents of the distribution address setting column 801 are discarded, and the display of the DHCP server setting screen 800 is finished.

FIG. 7B is a view showing an error message screen 1000 displayed when the network part of the range set on the DHCP server setting screen 800 overlaps with the network part of the second mode address.

As shown in FIG. 7B, the error message screen 1000 displays an error message for prompting a user to set a network part different from the network part of the second mode address used in the infrastructure mode. When an OK button 1001 is pressed, the DHCP server setting screen 800 will be displayed.

FIG. 7C is a view showing an error message screen 1200 displayed when the network part within the range set on the DHCP server setting screen 800 overlaps with the network part of the second mode address.

FIG. 7B and FIG. 7C are different with each other. FIG. 7B shows the screen that is displayed when the overlap occurs due to the setting on the DHCP server setting screen 800. On the other hand, FIG. 7C shows the screen that is displayed when the overlap occurs due to the distribution of the network part of the second mode address after the setting on the DHCP server setting screen 800.

As shown in FIG. 7C, a message for prompting a user to reset a range of an IP address of which a network part does not overlap with the network part of the second mode address on the DHCP server setting screen 800 is displayed on the error message screen 1200. A press of an OK button 1201 will close the error message screen 1200.

As shown in FIG. 7B and FIG. 7C mentioned above, when the IP address obtained from the access point 120 is included within the range set by the user, the messages that urge the user to reset a range are displayed on the operation panel 211 as the display unit in the embodiment.

Figure 8:
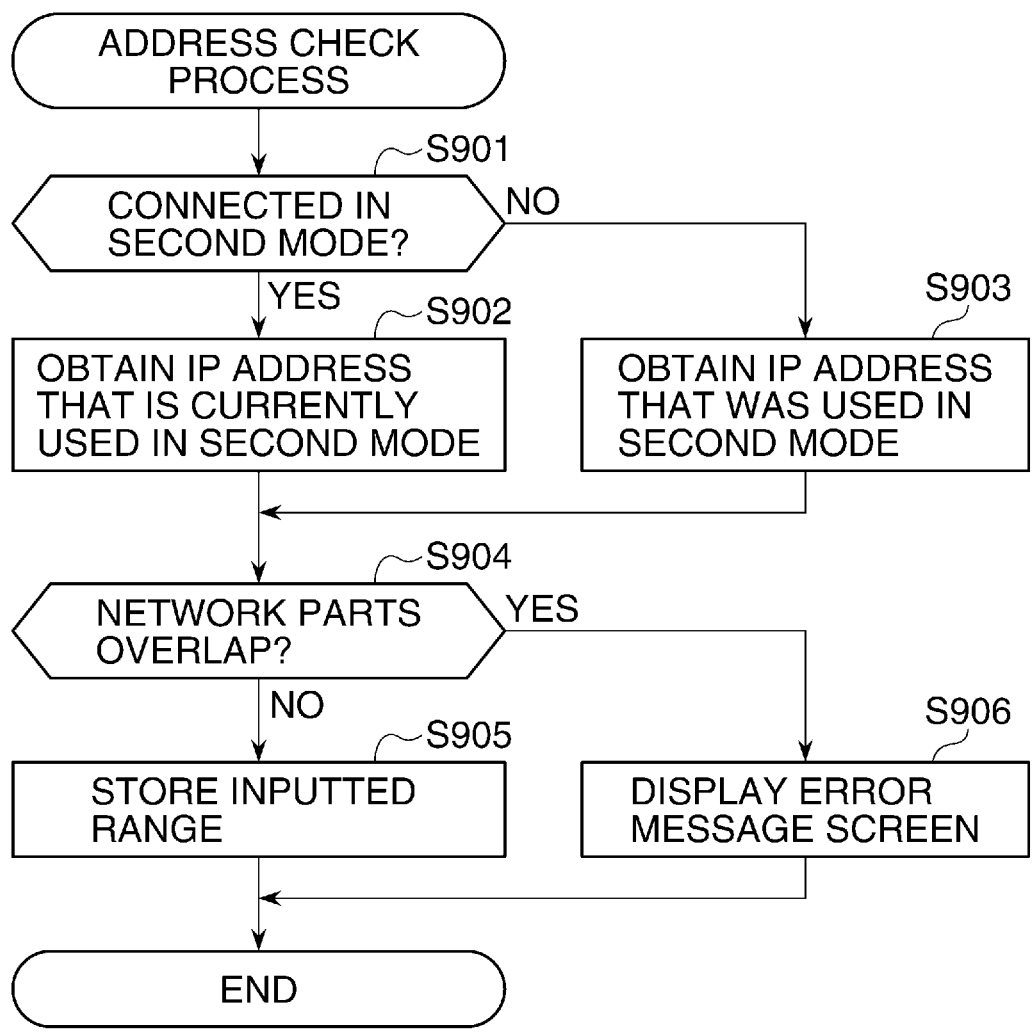
FIG. 8 is a flowchart showing procedures of an address check process executed by the CPU shown in FIG. 2.

FIG. 8 is a flowchart showing procedures of an address check process executed by the CPU 202 shown in FIG. 2.

This address check process checks overlap when the range is inputted on the DHCP server setting screen 800 in FIG. 7A and the OK button 802 is pressed.

As shown in FIG. 8, the operation control module 300 obtains the address setting information in the second mode with the storage module 301, and determines whether the image forming apparatus 100 is connected to the access point 120 in the second mode (step S901).

As a result of the determination in the step S901, when the apparatus has been already connected in the second mode (YES in the step S901), the IP address that is currently used in the second mode is obtained by the storage module 301 (step S902), and the process proceeds to the step S904.

On the other hand, when the apparatus is not connected in the second mode (NO in the step S901), the IP address that was used in the second mode is obtained (step S903). Here, the IP address that was used in the second mode at the last time shall be obtained by the storage module 301 as the IP address that was used in the second mode.

Then, it is determined whether the network part of the set range overlaps with the network part of the second mode address (step S904).

As a result of the determination in the step S904, the network parts do not overlap (NO in the step S904), the inputted range is determined as a range of an IP address distributed when operating as a DHCP server in the first mode, the range concerned is stored to the HDD 214 with the storage module 301 (step S905), and this process is finished.

On the other hand, as a result of the determination in the step S904, when the network parts overlap (YES in the step S904), the error message screen 1000 shown in FIG. 7B is displayed on the operation panel 211 (step S906), and the process is finished.

In FIG. 7A, "192.168.0.1~192.168.0.25" was inputted into the distribution address setting column 801 as an example.

Accordingly, when the second mode address is "192.168.0.100", for example, it is determined that they overlap by the overlap check in the step S904. When the second mode address is an address other than "192.168.0.xxx", it will be determined that they do not overlap.

Figure 9:
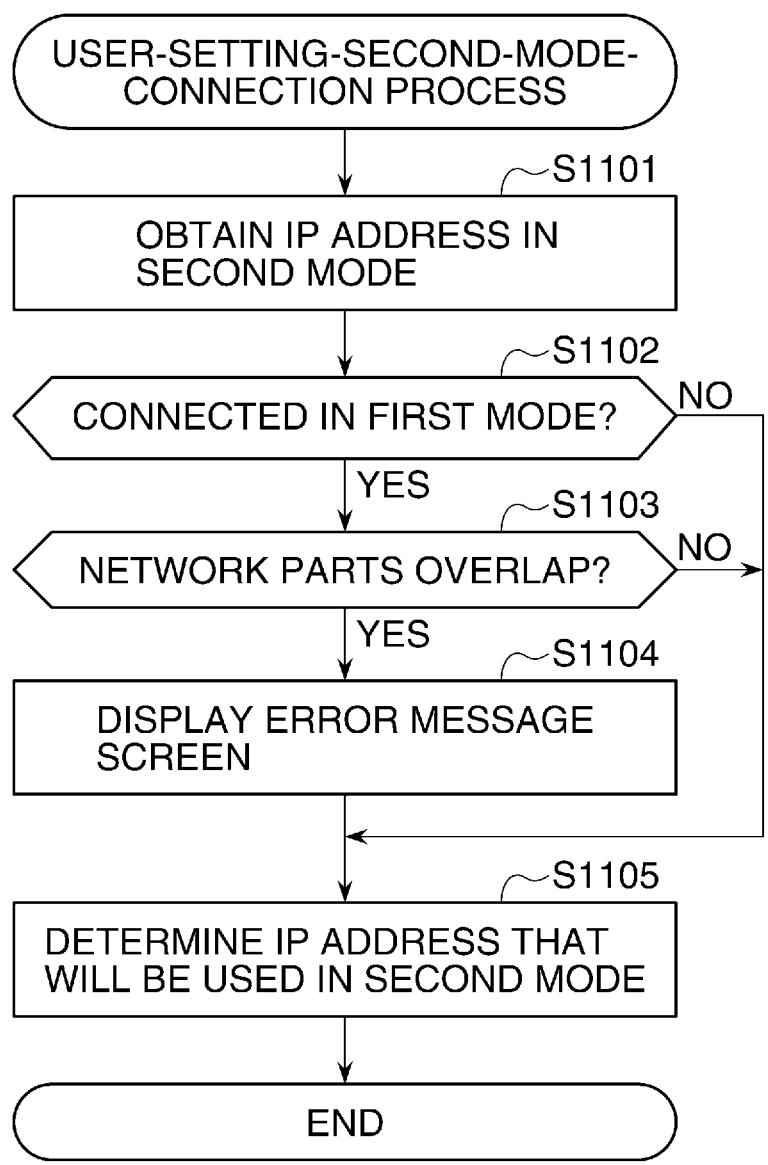
FIG. 9 is a flowchart showing procedures of a user-setting-second-mode-connection process executed by the CPU shown in FIG. 2.

FIG. 9 is a flowchart showing procedures of a user-setting-second-mode-connection process executed by the CPU 202 shown in FIG. 2.

This user-setting-second-mode-connection process is executed at the time of connecting in the second mode after setting the range on the DHCP server setting screen 800 shown in FIG. 7A.

As shown in FIG. 9, when receiving the command from the second mode control module 306, the address solution module 302 transmits a request as a DHCP client through the second mode communication module 307, and obtains the IP address in the second mode from the access point 120 (step S1101).

Next, the CPU 202 determines whether the apparatus is connecting in the first mode (step S1102). As a result of the determination in the step S1102, it is not connected in the first mode (NO in the step S1102), the obtained IP address is determined as an address that is used in the second mode (step S1105), the determined IP address is stored to the HDD 214 with the storage unit 301, and this process is finished.

On the other hand, as a result of the determination in the step S1102, when the apparatus has been already connected in the first mode (YES in the step S1102), the range set by the user is obtained by the storage module 301.

Then, it is determined whether the network part of the IP address obtained in the step S1101 overlaps with the network part of the set range (step S1103).

As a result of the determination in the step S1103, when the network parts do not overlap (NO in the step S1103), the process proceeds to the step S1105.

On the other hand, as a result of the determination in the step S1103, when the network parts overlap (YES in the step S1103), the error message screen 1200 shown in FIG. 7C is displayed on the operation panel 211 (step S1104).

Next, the IP address obtained in the step S1101 is determined as an address that will be used in the second mode (step S1105), the determined IP address is stored to the HDD 214 with the storage module 301, and this process is finished.

According to the processes in FIG. 8 and FIG. 9, since a user is requested to change the range when the addresses overlap or may overlap even if the user is allowed to set the range of the first mode address, overlap of IP addresses is avoidable.

The above-mentioned embodiment is described so as to allow simultaneous operations in the first mode and the second mode. However, there may be an application included in the application module 310 that does not support the simultaneous operations in the first mode and the second mode. In such a case, it is necessary to perform an exclusive control that allows an operation in the first mode and the operation in the second mode exclusively.

Figure 10:
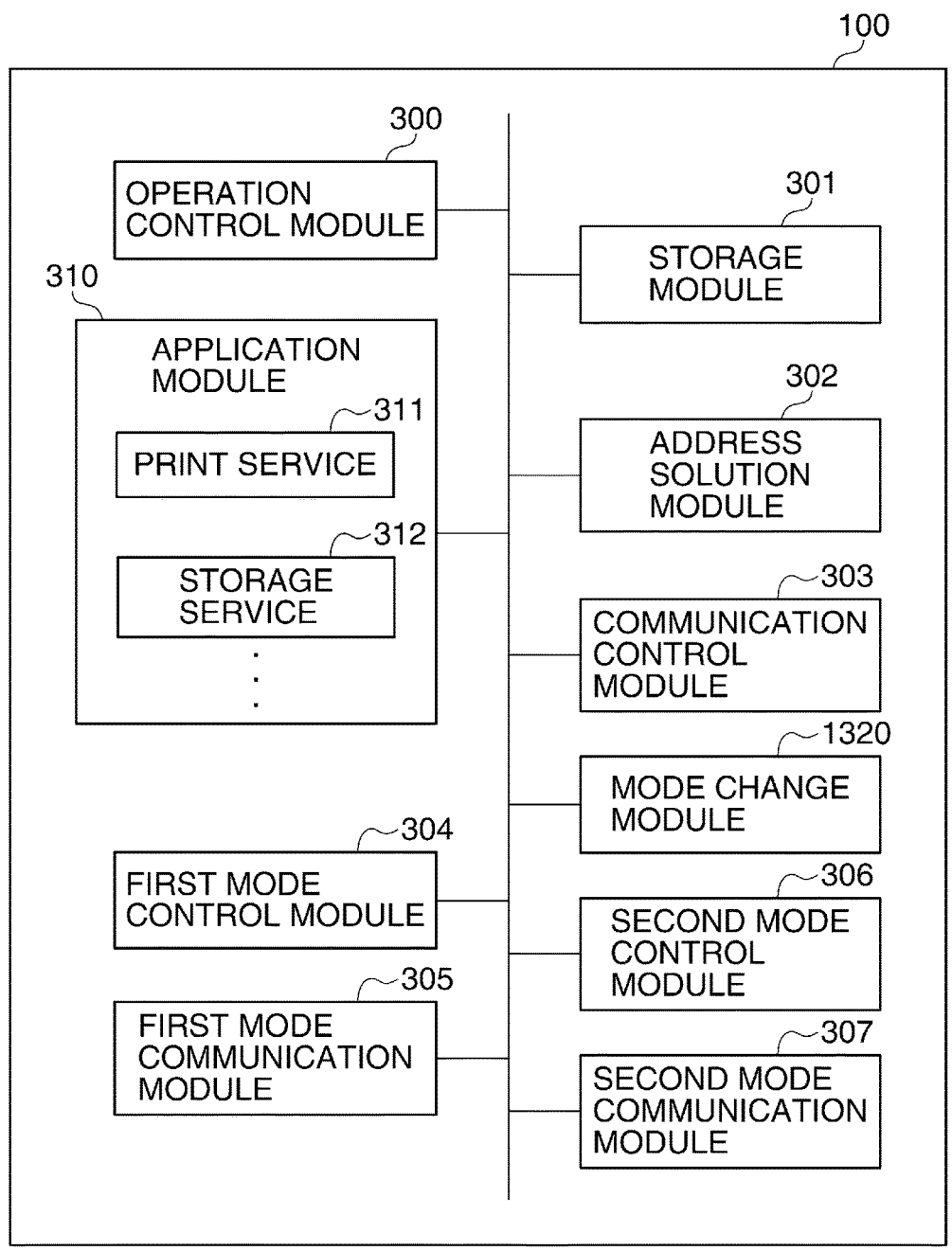
FIG. 10 is a block diagram schematically showing a software configuration of an image forming apparatus that performs an exclusive control according to a second embodiment of the present invention.

FIG. 10 is a block diagram schematically showing a software configuration of an image forming apparatus 100 that performs the exclusive control according to the second embodiment of the present invention.

The configuration in FIG. 10 includes a mode change module 1320 in addition to the configuration in FIG. 2.

The mode change module 1320 exclusively switches the communication to communicate in either of the first mode and the second mode. The communication control module 303 passes the data that will be transmitted to the network to the communication module that communicates in the communication mode that the mode change module 1320 selects.

Figure 11:
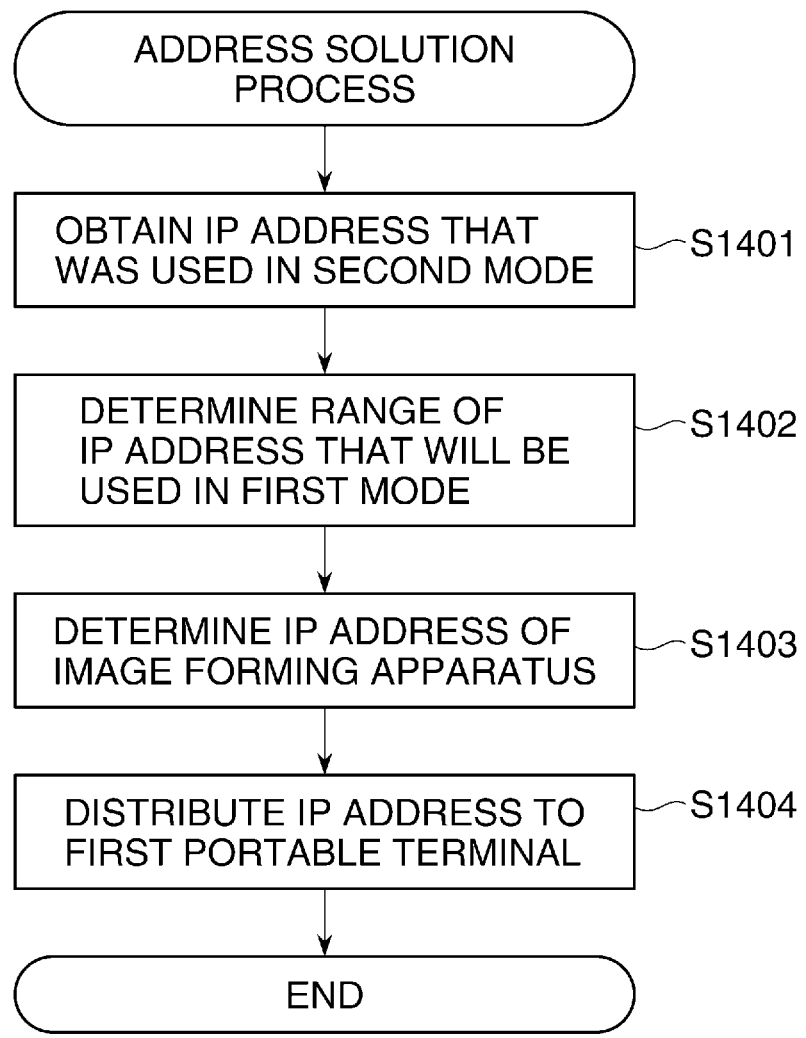
FIG. 11 is a flowchart showing procedures of an address solution process in the image forming apparatus in FIG. 10 during communication in the first mode.

FIG. 11 is a flowchart showing procedures of an address solution process in the image forming apparatus in FIG. 10 during communication in the first mode.

Since the address solution process shown in FIG. 11 is executed when the apparatus does not communicate in the second mode, the process in FIG. 11 is different from the process in FIG. 5 in that the process in the step S601 in FIG. 5 that determines whether the apparatus communicates in the second mode and the step S602 are unnecessary.

As shown in FIG. 11, the IP address that was used in the second mode is obtained (step S1401). Here, the IP address that was used in the second mode at the last time shall be obtained by the storage module 301 as the IP address that was used in the second mode.

Next, the range of a first mode address is determined using the obtained address (step S1402). The determination method in this step was described with reference to FIG. 5.

Next, the IP address of the image forming apparatus 100 in the first mode is selected from among IP addresses within the determined range (step S1403), and the selected IP address is stored to the HDD 214 with the storage module 301.

Then, an IP address that is included within the determined range and is different from the IP address selected in the step S1403 is distributed to the first portable terminal 110 (step S1404), and this process is finished.

Since the communication control module 303 has only to pass data to the communication module corresponding to the mode to which the mode change module 1320 changed when the exclusive control is performed, it is not necessary to refer to the network part, and erroneous transmission does not occur even if IP addresses overlap.

On the other hand, when logs, such as a print history and a communication history, are managed in association with IP addresses, IP addresses have to be controlled so as not to overlap because it is impossible to determine whether a content in a log shows an operation in the first mode or in the second mode.

Figure 12:
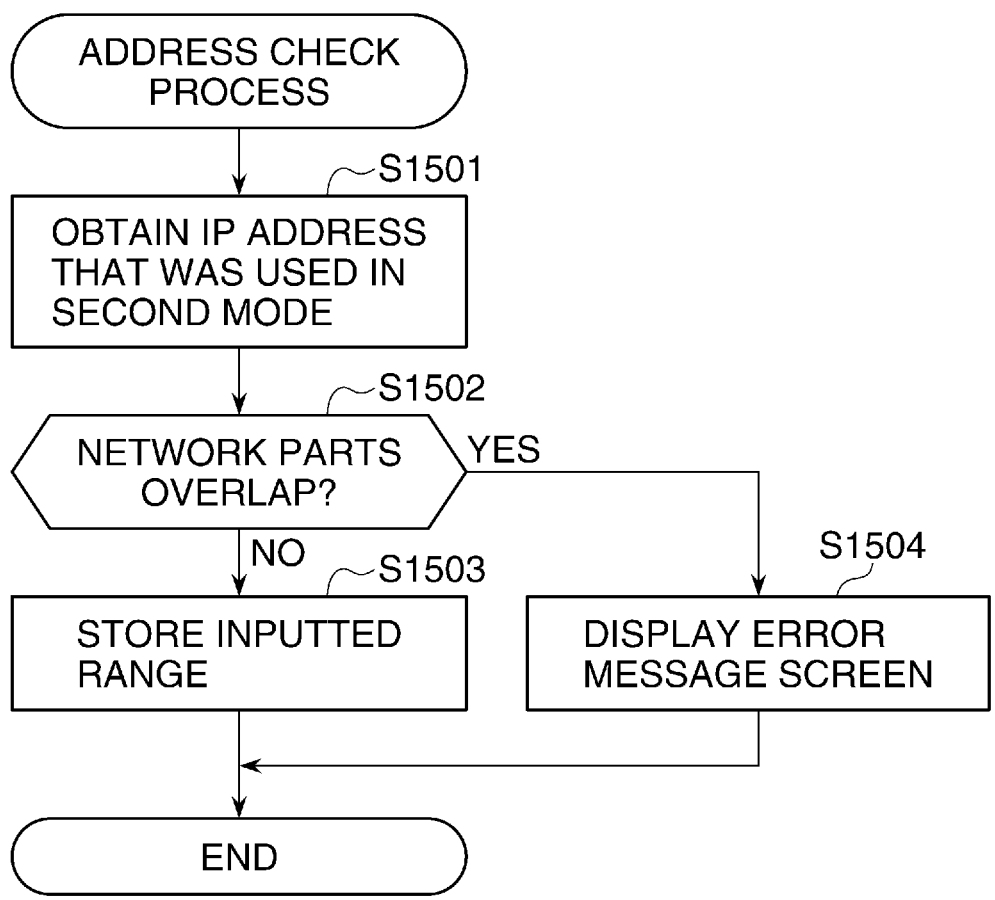
FIG. 12 is a flowchart showing procedures of an address check process in the image forming apparatus in FIG. 10 during communication in the first mode.
Figure 13:
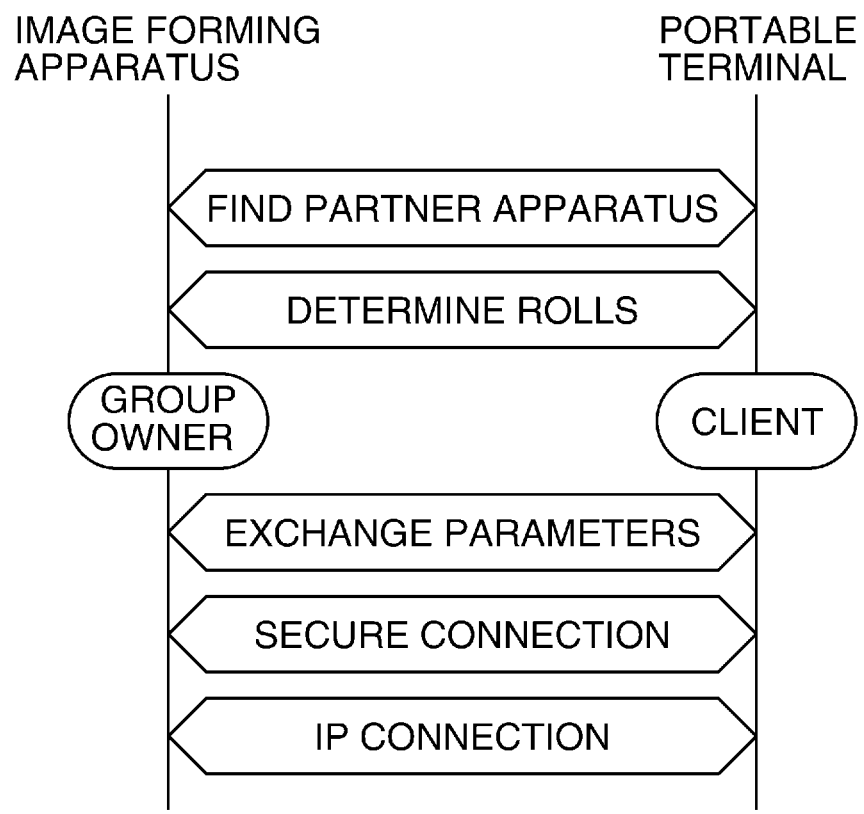
FIG. 13 is a view schematically showing a process sequence by the conventional Wi-Fi Direct.

FIG. 12 is a flowchart showing procedures of an address check process in the image forming apparatus in FIG. 10 during communication in the first mode.

This address check process checks overlap when the range is inputted on the DHCP server setting screen 800 in FIG. 7A and the OK button 802 is pressed.

As shown in FIG. 12, the operation control module 300 obtains the IP address that was used in the second mode (step S1501). Here, the IP address was used in the second mode at the last time is obtained by the storage module 301 as the IP address that was used in the second mode.

Then, it is determined whether the network part of the set range overlaps with the network part of the second mode address (step S1502).

As a result of the determination in the step S1502, when the network parts do not overlap (NO in the step S1502), the inputted range is determined as the range of the IP address that will be distributed when operating as a DHCP server in the first mode, the range concerned is stored to the HDD 214 with the storage module 301 (step S1503), and this process is finished.

On the other hand, as a result of the determination in the step S1502, when the network parts overlap (YES in the step S1502), the error message screen 1000 shown in FIG. 7B is displayed on the operation panel 211 (step S1504), and the process is finished.

According to the processes in FIG. 11 and FIG. 12, overlap of IP addresses is avoidable even if an application included in the application module 310 does not support the simultaneous operations in the first mode and the second mode.

As described above, the IP address distributed to the external apparatus on the second network is determined on the basis of the IP address currently used in the communication with the external apparatus on the first network (step S604 and S1402) according to the embodiments. Then, the determined IP address is distributed to the external apparatus on the second network (steps S606 and S1404).

Since the IP address that does not overlap is distributed in this way, erroneous transmission of data is prevented without disturbing communication with a network device.

Although the image forming apparatus is described as an example of the communication apparatus in the above-mentioned embodiment, the processes and the configurations concerning the meaning of the present invention do not use the features of the image forming apparatus, and are achieved with general communication apparatuses, such as a PC and a mobile phone. Accordingly the present invention is applicable to a general communication apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)*), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-000885, filed Jan. 7, 2014, which is hereby incorporated by reference herein in its entirety.

What is claimed is:

1. A communication apparatus that provides an access point and allocates one IP address, from among one or more IP addresses that are candidates of allocation, to an external terminal configured to access the access point in order to communicate with the external terminal in a first communication mode, the communication apparatus comprising:

a display which displays information;

a network interface to which an IP address used for connecting to a specific network is allocated in order for the communication apparatus to communicate in a second communication mode different from the first communication mode; and at least one controller configured to function as:

a reception unit configured to receive an input of setting information used in a communication via the access point per the first communication mode, the input setting information including the one or more IP addresses that are candidates of allocation for allocation to the external terminal configured to access the access point provided by the communication apparatus; and a control unit configured to:

obtain the IP address used for connecting to the specific network per the second communication mode;

determine whether the communication apparatus is connected to at least one external terminal via the access point per the first communication mode;

determine, in a case where it is determined that the communication apparatus is connected to the at least one external terminal via the access point per the first communication mode, whether the obtained IP address used for connecting to the specific network per the second communication mode matches at least one IP address out of the one or more IP addresses that are candidates of allocation for allocation to the external terminal based on the input setting information used in the communication via the access point per the first communication mode, and control the display to display the information so that an operation to perform a communication via the specific network per the second communication mode and the communication via the access point per the first communication mode at the same time, is not allowed, in a case where it is determined the obtained IP address used for connecting to the specific network matches at least one IP address out of the one or more IP addresses that are candidates of allocation for allocation to the external terminal; and set, in a case where it is determined that the communication apparatus is not connected to the at least one external terminal via the access point per the first communication mode, the obtained IP address used for connecting to the specific network to be used in the communication via the specific network per the second communication mode without determining whether the obtained IP address used for connecting to the specific network per the second communication mode matches at least one IP address out of the one or more IP addresses that are candidates of allocation for allocation to the external terminal per the first communication mode, wherein in a case where it is determined the obtained IP address used for connecting to the specific network does not match at least one IP address out of the one or more IP addresses that are candidates of allocation for allocation to the external terminal, the operation to perform the communication via the specific network per the second communication mode and the communication via the access point per the first communication mode at the same time, is allowed.

2. The communication apparatus according to claim 1, wherein the control unit controls the display to display a setting screen through which the setting information is input, and the control unit controls the display to display an error screen based on a fact that the obtained IP address used for connecting to the specific network matches at least one IP address out of the one or more IP addresses that are candidates of allocation based on the setting information input through the setting screen.

3. The communication apparatus according to claim 1, wherein the control unit controls the display to display a setting screen through which the setting information is input, and the control unit controls the display to display a message prompting a user to input further setting information to the setting screen, based on a fact that the obtained IP address used for connecting to the specific network matches at least one IP address out of the one or more IP addresses that are candidates of allocation based on the setting information input through the setting screen.

4. The communication apparatus according to claim 1, wherein the network interface is a wireless LAN interface, and the access point is provided by the wireless LAN interface.

5. The communication apparatus according to claim 1, wherein the network interface is a wired LAN interface, and the access point is provided by another interface different from the wired LAN interface.

6. The communication apparatus according to claim 1, wherein the one or more IP addresses that are candidates of allocation are IP addresses of which network parts are the same and host parts are different from one another.

7. The communication apparatus according to claim 1, wherein an IP address of the access point is input as the setting information.

8. The communication apparatus according to claim 1, wherein an IP address of the access point and the one or more IP addresses that are candidates of allocation are input as the setting information as a range of IP addresses.

9. The communication apparatus according to claim 1, wherein the access point is a Group Owner in Wi-Fi Direct.

10. The communication apparatus according to claim 1, wherein the obtained IP address used for connecting to the specific network is an IP address distributed from an external device.

11. The communication apparatus according to claim 1, further comprising a print device,
wherein the controller outputs, to the print device, print data obtained via the specific network or the access point.

12. A communication apparatus that provides an access point and allocates one IP address, from among one or more IP addresses that are candidates of allocation, to an external terminal configured to access the access point in order to communicate with the external terminal in a first communication mode, the communication apparatus comprising:
a display which displays information;
a network interface to which a first IP address used for connecting to a specific network is allocated in order for the communication apparatus to communicate in a second communication mode different from the first communication mode, the first IP address having a network part and a host part; and
at least one controller configured to function as:
a reception unit configured to receive an input of setting information used in a communication via the access point per the first communication mode, the input setting information including the one or more IP addresses that are candidates of allocation for allocation to the external terminal configured to access the access point provided by the communication apparatus; and
a control unit configured to:
obtain the first IP address used for connecting to the specific network per the second communication mode;
determine whether the communication apparatus is connected to at least one external terminal via the access point per the first communication mode;
determine, in a case where it is determined that the communication apparatus is connected to the at least one external terminal via the access point per the first communication mode, whether the network part of the first IP address used for connecting to the specific network per the second communication mode matches a network part of the one or more IP addresses that are candidates of allocation for allocation to the external terminal based on the input setting information used in the communication via the access point per the first communication mode, and control the display to display the information so that an operation to perform a communication via the specific network per the second communication mode and the communication via the access point per the first communication mode at the same time, is not allowed, in a case where it is determined that the network part of the first IP address used for connecting to the specific network matches the network part of the one or more IP addresses that are candidates of allocation for allocation to the external terminal based on the input setting information used in the communication via the access point; and
set, in a case where it is determined that the communication apparatus is not connected to the at least one external terminal via the access point per the first communication mode, the first IP address used for connecting to the specific network to be used in the communication via the specific network per the second communication mode without determining whether the network part of the first IP address used for connecting to the specific network per the second communication mode matches the network part of the one or more IP addresses that are candidates of allocation for allocation to the external terminal per the first communication mode, wherein in a case where it is determined the network part of the first IP address used for connecting to the specific network per the second communication mode does not match the network part of the one or more IP addresses that are candidates of allocation for allocation to the external terminal per the first communication mode, the operation to perform the communication via the specific network per the second communication mode and the communication via the access point per the first communication mode at the same time, is allowed.

13. The communication apparatus according to claim 12, wherein the control unit controls the display to display a setting screen through which the setting information is input, and the control unit controls the display to display an error screen based on a fact that the network part of the first IP address used for connecting to the specific network matches the network part of the one or more IP addresses that are candidates of allocation for allocation to the external terminal.

14. The communication apparatus according to claim 12, wherein the control unit controls the display to display a setting screen through which the setting information is input, and the control unit controls the display to display a message prompting a user to input further setting information to the setting screen, based on a fact that the network part of the first IP address used for connecting to the specific network matches the network part of the one or more IP addresses that are candidates of allocation for allocation to the external terminal.

15. The communication apparatus according to claim 12, wherein the network interface is a wireless LAN interface, and the access point is provided by the wireless LAN interface.

16. The communication apparatus according to claim 12, wherein the network interface is a wired LAN interface, and the access point is provided by another interface different from the wired LAN interface.

17. The communication apparatus according to claim 12, wherein the one or more IP addresses that are candidates of allocation are IP addresses of which network parts are the same and host parts are different from one another.

18. The communication apparatus according to claim 12, wherein an IP address of the access point is input as the setting information.

19. The communication apparatus according to claim 12, wherein an IP address of the access point and the one or more IP addresses that are candidates of allocation are input as the setting information as a range of IP addresses.

20. The communication apparatus according to claim 12, wherein the access point is a Group Owner in Wi-Fi Direct.

21. The communication apparatus according to claim 12, wherein the first IP address used for connecting to the specific network is an IP address distributed from an external device.

22. The communication apparatus according to claim 12, further comprising a print device, wherein the controller outputs, to the print device, print data obtained via the specific network or the access point.

23. A control method for a communication apparatus that provides an access point and allocates one IP address, from among one or more IP addresses that are candidates of allocation, to an external terminal configured to access the access point in order to communicate with the external terminal in a first communication mode, the method comprising:

allocating a first IP address, used for connecting to a specific network in order for the communication apparatus to communicate in a second communication mode different from the first communication mode, to a network interface, the first IP address having a network part and a host part;

receiving an input of setting information used in communication via the access point per the first communication mode, the input setting information including the one or more IP addresses that are candidates of allocation for allocation to the external terminal configured to access the access point provided by the communication apparatus;

obtaining the first IP address used for connecting to the specific network per the second communication mode;

determining whether the communication apparatus is connected to at least one external terminal via the access point per the first communication mode;

determining, in a case where it is determined that the communication apparatus is connected to the at least one external terminal via the access point per the first communication mode, whether the network part of the first IP address used for connecting to the specific network per the second communication mode matches a network part of the one or more IP addresses that are candidates of allocation for allocation to the external terminal based on the input setting information used in the communication via the access point per the first communication mode, and displaying on a display information so that an operation to perform a communication via the specific network per the second communication mode and the communication via the access point per the first communication mode at the same time, is not allowed, in a case where it is determined that the network part of the first IP address used for connecting to the specific network matches the network part of the one or more IP addresses that are candidates of allocation for allocation to the external terminal based on the input setting information used in the communication via the access point;

setting, in a case where it is determined that the communication apparatus is not connected to the at least one external terminal via the access point per the first communication mode, the first IP address used for connecting to the specific network to be used in the communication via the specific network per the second communication mode without determining whether the network part of the first IP address used for connecting to the specific network per the second communication mode matches the network part of the one or more IP addresses that are candidates of allocation for allocation to the external terminal per the first communication mode; and allowing, in a case where it is determined the network part of the first IP address used for connecting to the specific network per the second communication mode does not match the network part of the one or more IP addresses that are candidates of allocation for allocation to the external terminal per the first communication mode, the operation to perform the communication via the specific network per the second communication mode and the communication via the access point per the first communication mode at the same time.

24. A non-transitory computer-readable storage medium storing computer executable instructions that cause a computer to execute a control method for a communication apparatus that provides an access point and allocates one IP address, from among one or more IP addresses that are candidates of allocation, to an external terminal configured to access the access point in order to communicate with the external terminal in a first communication mode, the method comprising:
- allocating a first IP address, used for connecting to a specific network in order for the communication apparatus to communicate in a second communication mode different from the first communication mode, to a network interface, the first IP address having a network part and a host part;
- receiving an input of setting information used in communication via the access point per the first communication mode, the input setting information including the one or more IP addresses that are candidates of allocation for allocation to the external terminal configured to access the access point provided by the communication apparatus;
- obtaining the first IP address used for connecting to the specific network per the second communication mode;
- determining whether the communication apparatus is connected to at least one external terminal via the access point per the first communication mode;
- determining, in a case where it is determined that the communication apparatus is connected to the at least one external terminal via the access point per the first communication mode, whether the network part of the first IP address used for connecting to the specific network per the second communication mode matches a network part of the one or more IP addresses that are candidates of allocation for allocation to the external terminal based on the input setting information used in the communication via the access point per the first communication mode, and displaying on a display information so that an operation to perform a communication via the specific network per the second communication mode and the communication via the access point per the first communication mode at the same time, is not allowed, in a case where it is determined that the network part of the first IP address used for connecting to the specific network matches the network part of the one or more IP addresses that are candidates of allocation for allocation to the external terminal based on the input setting information used in the communication via the access point;
- setting, in a case where it is determined that the communication apparatus is not connected to the at least one external terminal via the access point per the first communication mode, the first IP address used for connecting to the specific network to be used in the communication via the specific network per the second communication mode without determining whether the network part of the first IP address used for connecting to the specific network per the second communication mode matches the network part of the one or more IP addresses that are candidates of allocation for allocation to the external terminal per the first communication mode; and
- allowing, in a case where it is determined the network part of the first IP address used for connecting to the specific network per the second communication mode does not match the network part of the one or more IP addresses that are candidates of allocation for allocation to the external terminal per the first communication mode, the operation to perform the communication via the specific network per the second communication mode and the communication via the access point per the first communication mode at the same time.

* * * * *